US010486805B2

(12) United States Patent
Rothermich et al.

(10) Patent No.: US 10,486,805 B2
(45) Date of Patent: Nov. 26, 2019

(54) ROTOR BLADE CONTROL HORN ARRANGEMENTS

(71) Applicant: Sikorsky Aircraft Corporation, Stratford, CT (US)

(72) Inventors: Brian Rothermich, Sutton, MA (US); Leon M. Meyer, Harwinton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 194 days.

(21) Appl. No.: 15/721,519

(22) Filed: Sep. 29, 2017

(65) Prior Publication Data
US 2018/0105264 A1    Apr. 19, 2018

Related U.S. Application Data

(60) Provisional application No. 62/410,153, filed on Oct. 19, 2016.

(51) Int. Cl.
| | | |
|---|---|---|
| *B64C 27/78* | (2006.01) | |
| *B64C 27/473* | (2006.01) | |
| *B64D 15/12* | (2006.01) | |
| *B64C 27/59* | (2006.01) | |
| *B64C 27/82* | (2006.01) | |
| *B64C 11/32* | (2006.01) | |
| *B64C 11/30* | (2006.01) | |
| *B64C 27/605* | (2006.01) | |

(52) U.S. Cl.
CPC ............ *B64C 27/473* (2013.01); *B64C 11/32* (2013.01); *B64C 27/59* (2013.01); *B64C 27/82* (2013.01); *B64D 15/12* (2013.01); *B64C 11/30* (2013.01); *B64C 27/605* (2013.01); *B64C 27/78* (2013.01); *B64C 2027/4736* (2013.01)

(58) Field of Classification Search
CPC ....... B64C 27/78; B64C 27/473; B64C 27/59; B64C 27/605; B64C 27/82; B64C 11/30; B64C 11/32
See application file for complete search history.

(56) References Cited

U.S. PATENT DOCUMENTS

| | | | | | |
|---|---|---|---|---|---|
| 4,568,244 | A | * | 2/1986 | Wehnert | ................... B64C 27/32 416/134 A |
| 4,568,245 | A | * | 2/1986 | Hibyan | .................... B64C 27/32 416/134 A |
| 4,868,962 | A | * | 9/1989 | McArdle | ............... B29C 70/347 29/889.6 |
| 5,562,416 | A | * | 10/1996 | Schmaling | .............. B64C 27/48 416/134 A |
| 5,620,305 | A | * | 4/1997 | McArdle | ................. B64C 27/45 416/134 A |

(Continued)

*Primary Examiner* — Carlos A Rivera
*Assistant Examiner* — Behnoush Haghighian
(74) *Attorney, Agent, or Firm* — Cantor Colburn LLP (57) ABSTRACT

A control horn arrangement includes a control horn body with an inboard end and an opposed outboard end. The control horn body defines a torque tube axis which extends between the inboard and outboard end of the control horn body. An inner flange and an outer flange are disposed on the outboard end of the control horn body. The inner flange and the outer flange extend about the torque tube axis and define between one another a receptacle to fix a torque tube to the outboard end of the control horn body.

20 Claims, 8 Drawing Sheets

(56) References Cited

U.S. PATENT DOCUMENTS

| | | | |
|---|---|---|---|
| 7,216,429 B2* | 5/2007 | Logan | B64C 27/473 |
| | | | 244/17.23 |
| 9,156,544 B2* | 10/2015 | Wiinikka | B64C 27/605 |
| 9,359,071 B2* | 6/2016 | Kuntze-Fechner | B64C 27/33 |
| 9,714,579 B2* | 7/2017 | Kuntze-Fechner | B64C 27/33 |
| 9,718,542 B2* | 8/2017 | Kuntze-Fechner | B64C 27/33 |
| 9,783,290 B2* | 10/2017 | Covington | B64C 27/64 |
| 9,889,929 B2* | 2/2018 | Covington | B64C 27/64 |
| 2008/0292468 A1* | 11/2008 | Stamps | B64C 27/32 |
| | | | 416/244 R |

* cited by examiner

ROTOR BLADE CONTROL HORN ARRANGEMENTS

CROSS-REFERENCE TO RELATED APPLICATION

This application claims the benefit of priority under 35 U.S.C. § 119(e) to U.S. Provisional Application No. 62/410,153, filed Oct. 19, 2016, the contents of which is incorporated herein by reference in its entirety.

BACKGROUND OF THE INVENTION

1. Field of the Invention

The present disclosure relates to rotor blades, and more particularly to control horn arrangements for fixing torque tubes to control horns in rotary blades for rotorcraft.

2. Description of Related Art

Rotorcraft like helicopters commonly include tail rotor systems arranged to generate aerodynamic thrust in opposition to torque applied to the rotorcraft airframe by the main rotor system, and to provide directional control. The tail rotor system generally includes a tail rotor assembly with rotor blades and a rotor blade pitch control system operably connected to the rotor blades. The pitch control system typically changes the pitch of the tail rotor blades in concert with one another, i.e. collectively, thereby changing via variable pitch of each tail rotor blade thrust applied to the rotorcraft by rotation of the tail rotor assembly.

In some tail rotor systems the pitch control system includes a pitch beam connected to the tail rotor blades by blade linkages. The pitch beam rotates with the tail rotor blades and is displaceable axially along the center of rotation of the rotor system relative to the tail rotor blades. Displacement of the pitch beam applies force to the tail rotor blade at the location offset from a spanwise axis of each tail rotor blade. The force applies torque, which rotates the blades about their spanwise axes, defining the pitch setting. The connection between the tail rotor blade and linkage needs to be sufficiently robust to provide pitch control, withstand static and fatigue flight loads, and endure environmental phenomena like lightning and foreign object impacts.

Such conventional methods and systems have generally been considered satisfactory for their intended purpose. However, there is still a need in the art for improved rotor blade assemblies. The present disclosure provides a solution for this need.

SUMMARY OF THE INVENTION

A control horn arrangement includes a control horn body connectable to a torque tube with an inboard end and an opposed outboard end. The control horn body defines a torque tube axis which extends between the inboard and outboard end of the control horn body. An inner flange and an outer flange are disposed on the outboard end of the control horn body and extend axially from the outboard end of the control horn body. The inner flange and the outer flange extend about the torque tube axis and define between one another a receptacle to fix a torque tube to the outboard end of the control horn body.

In certain embodiments, the inner flange can extend continuously about the torque tube axis. The outer flange can extend partially about the torque tube axis. The outer flange can include a pressure-side segment and a suction-side segment. The pressure-side segment can be separated from the suction-side segment by a gap. A closure can connect the pressure-side segment to the suction-side segment. The gap can be disposed on a leading edge of the control horn body. The gap can be disposed on a trailing edge of the control horn body. Both leading and trailing edge gaps can separate the pressure-side segment from the suction side segment.

In accordance with certain embodiments, the outer flange can radially overlap the inner flange. The inner flange can extend axially along the torque tube axis to a location beyond the outer flange. The outer flange can angled away from the inner flange. An axially outer portion of the outer flange can be spaced apart further from the inner flange than an axially inner portion of the outer flange.

It is also contemplated that, in accordance with certain embodiments, the inner flange has torque tube-facing surface with an adhesive layer on the inner flange torque tube-facing surface. The outer flange can have a torque tube-facing surface with an adhesive layer on the outer flange torque tube-facing surface. A torque tube can be seated in the receptacle and bonded to the inner and outer flanges of the control horn body. A rotor assembly can include a torque tube bonded to a pitch horn using the pitch horn arrangement as described above. The rotor assembly can be a rotor assembly for rotorcraft anti-torque system, such as for a helicopter.

A rotor assembly includes a control horn body and a torque tube. The control horn body has an inboard end, an opposed outboard end, and defines a torque tube axis extending between the control horn body inboard and outboard ends. Inner and outer flanges are disposed on the control horn body outboard end, the inner and outer flanges extending about the torque tube axis to define a receptacle. An inboard end of the torque tube seats in the receptacle, and inner and outer gaps are defined between the flanges and the torque tube inboard end. An inner adhesive layer is disposed in the inner gap and bonds the torque tube to the control horn body. An outer adhesive layer is disposed in the outer gap and bonds the torque tube to the control horn body.

In certain embodiments, a spar can extend along the torque tube axis. The spar can be connected to the control horn body and torque tube, such as with a non-rigid connection like a pivot bearing. The torque tube can be attached the spar outboard at about the spar midspan, and bonded and/or fastened thereto by fasteners. The outer flange can radially overlap the inner flange, the inner flange can extend axially beyond the outer flange and be angled away from the inner flange, and an axially outer portion of the outer flange is spaced apart further from the inner flange than an axially inner portion of the outer flange.

In accordance with certain embodiments, an ice protection circuit can be fixed to a leading edge of the torque tube. The ice protection circuit can radially overlap the inner flange. The outer flange can have a pressure side and an opposed suction side. The suction side can be separated from the pressure side by gaps disposed on a leading edge and a trailing edge of the control horn body.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
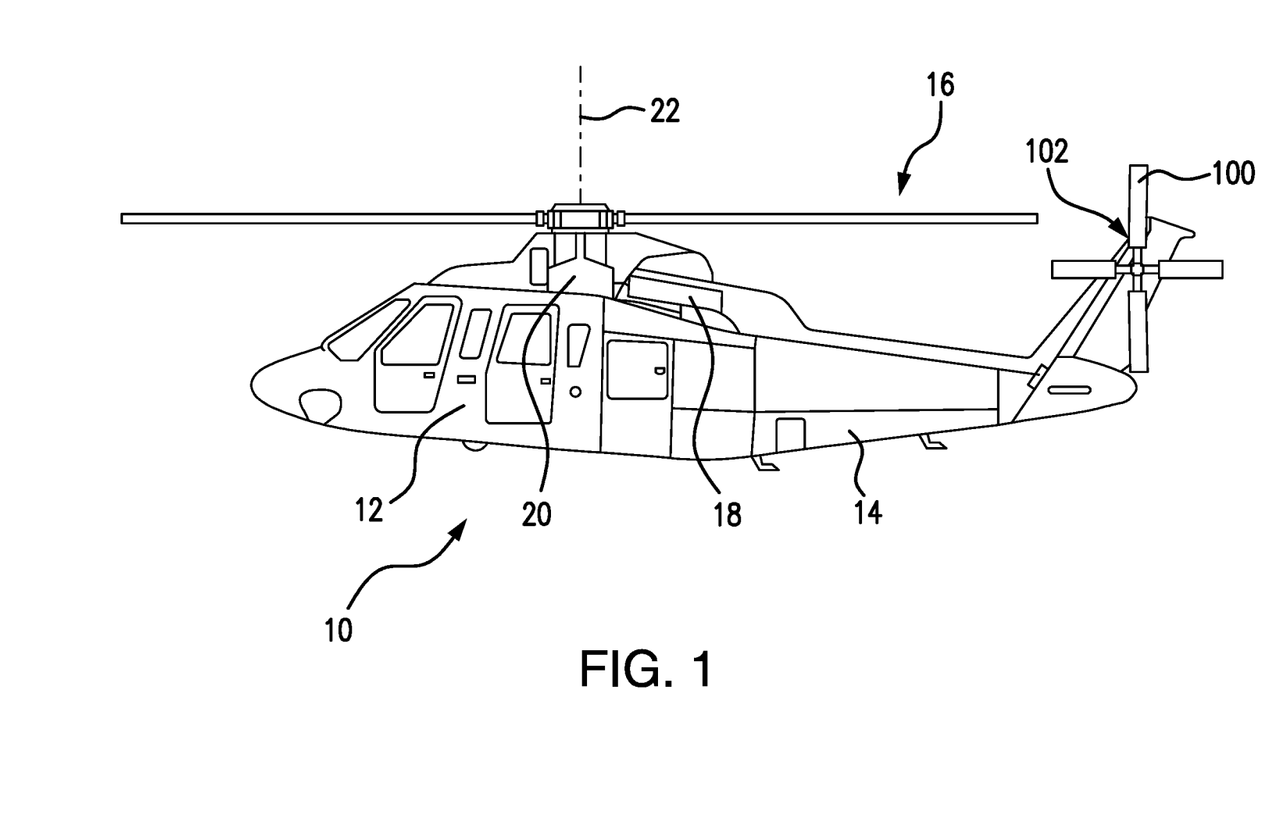
FIG. 1 is a schematic perspective view of an exemplary embodiment of a rotorcraft constructed in accordance with the present disclosure, showing a tail rotor blade with a control horn arrangement.

Reference will now be made to the drawings wherein like reference numerals identify similar structural features or aspects of the subject disclosure. For purposes of explanation and illustration, and not limitation, a partial view of an exemplary embodiment of a pitch horn arrangement in accordance with the disclosure is shown in FIG. 1 and is designated generally by reference character 102. Other embodiments of pitch horn arrangements, rotor blades, and rotorcraft in accordance with the present disclosure, or aspects thereof, are provided in FIGS. 2-8, as will be described. The systems and methods described herein can be used for fixing torque tubes to control horns in helicopter tail rotor systems, though the present disclosure is not limited to tail rotor systems or to rotorcraft in general.

Referring the FIG. 1, an exemplary rotorcraft 10, e.g., a helicopter is shown. Rotorcraft 10 includes an airframe 12 with a longitudinally extending tail 14, a main rotor assembly 16, and a tail rotor blade 100. Airframe 12 supports one or more engines 18 (such as a gas turbine engine) and is operatively connected to a generator 20 and main rotor assembly 16 to drive main rotor assembly 16 in rotation about a main rotor rotation axis 22. The one or more engines 18 are also operatively connected to tail rotor blade 100 to drive tail rotor blade 100 in rotation about a tail rotor axis 24 (shown in FIG. 2). While shown with respect to a non-coaxial aircraft, it is understood that aspects of the invention can be used in coaxial aircraft, fixed wing aircraft, tilt rotor aircraft, and that engine 18 can be other types of engines, including piston and/or electrical engines.

As will be appreciated by those of skill in the art, rotation of main rotor assembly 16 about main rotor rotation axis 22 exerts a torque reaction 26 (shown in FIG. 2) on airframe 12. Rotation of tail rotor blade 100 about tail rotor rotation axis 24 generates thrust 28 (shown in FIG. 2), i.e. a load offset from the main rotor rotation axis 22, in opposition to torque reaction 26, thereby providing control of rotorcraft 10 during flight. The magnitude of thrust 28 is controlled by a pitch control system 30 (shown in FIG. 2). Pitch control system 30 is operably connected to tail rotor blade 100 to collectively change pitch of tail rotor blade 100. In the context of a coaxial aircraft having little or no torque 26, it is understood that the tail rotor blade 100 could be a propulsors which produces thrust 28 to propel the coaxial aircraft.

Figure 2:
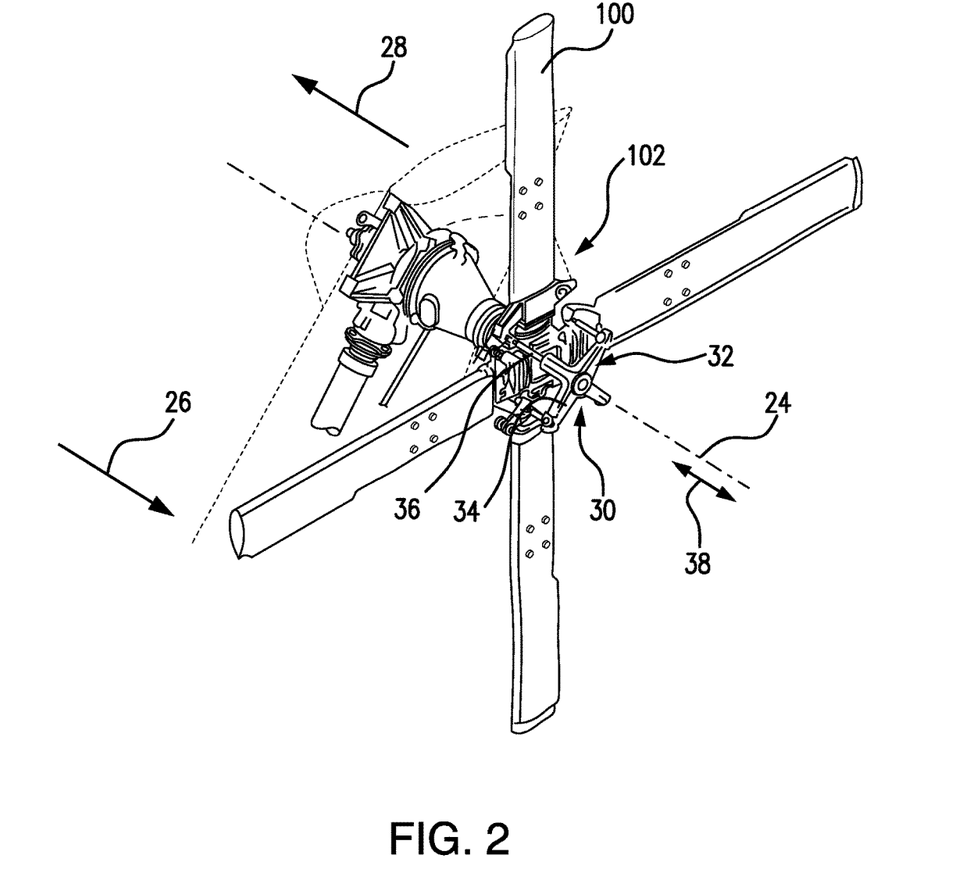
FIG. 2 is a perspective view of the rotorcraft shown in FIG. 1, showing a pitch control system operably connected to the control horn arrangement.

With reference to FIG. 2, pitch control system 30 is shown. Pitch control system 30 includes a pitch beam 32. Pitch beam 32 is arranged axially along tail rotor rotation axis 24 and has arms 34. Arms 34 extend laterally relative to tail rotor rotation axis 24 and connect to control horn arrangement 102 through respective linkages 36. Linkages 36 couple to control horn arrangement 102 at location off of an axis 106 (shown in FIG. 3) defined by control horn arrangement 102, axial displacement of pitch beam 32 thereby applying a collective force 38 to tail rotor blade 100. Collective force 38 twists tail rotor blade 100 about axis 106 (shown in FIG. 3) defined by control horn arrangement 102, changing pitch of tail rotor blade 100. As will be appreciated by those of skill in the art, changing pitch of tail rotor blade 100 alters thrust 28 (shown in FIG. 1) generated by tail rotor blade 100.

Figure 3:
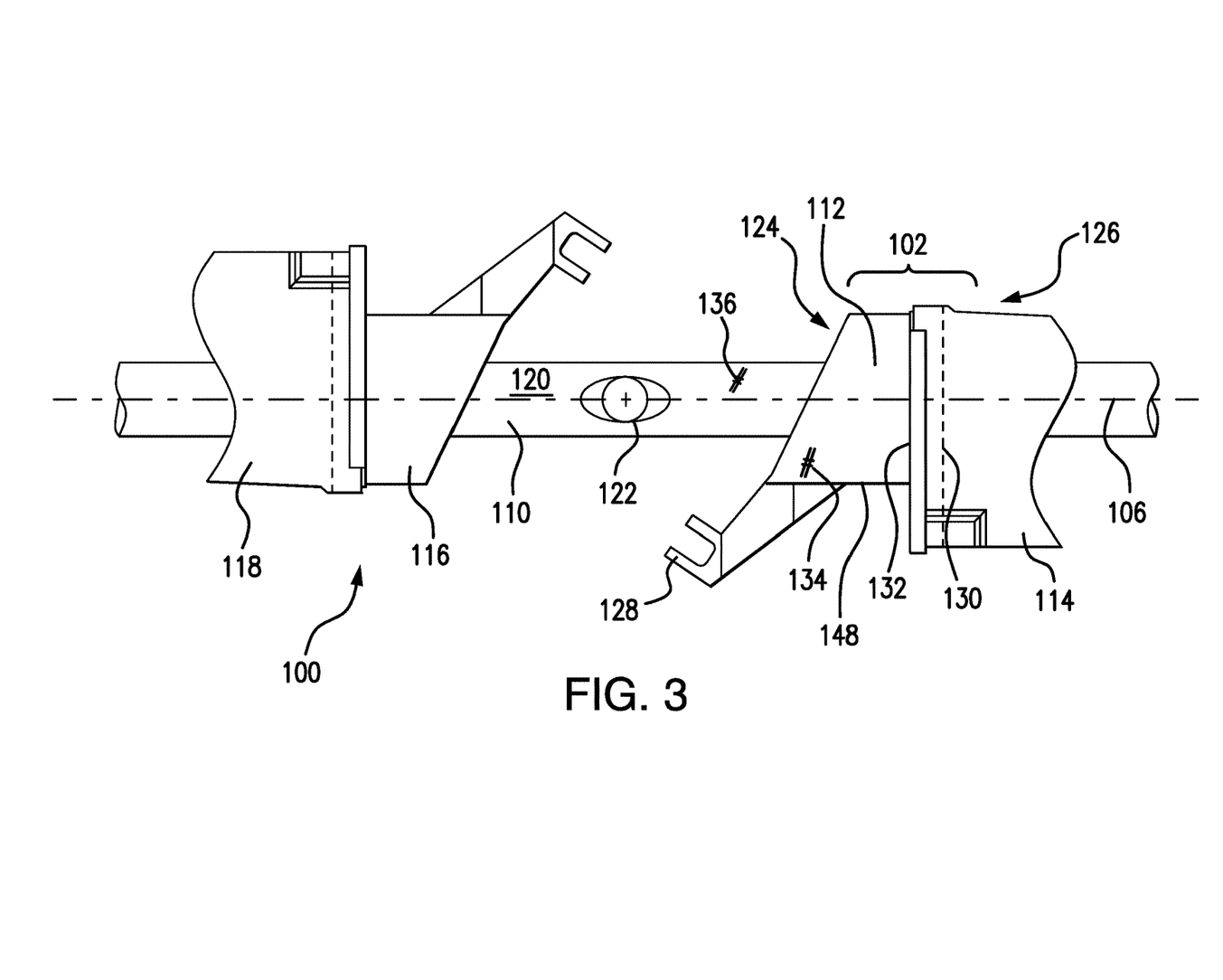
FIG. 3 is a plan view of tail rotor blade shown in FIG. 1, showing a control horns and torque tubes connected to spar of the tail rotor blade.

With reference to FIG. 3, tail rotor blade 100 is shown. Tail rotor blade 100 includes a spar 110, a control horn body 112, and a torque tube 114. Torque tube 114 is fixed to control horn body 112 by control horn arrangement 102, and therethrough to spar 110. In the illustrated exemplary embodiment control horn body 112 is a first control horn body 112 and tail rotor blade 100 includes a second control horn body 116 with a second torque tube 118 fixed thereto, and therethrough to spar 110. Second control horn body 116 and second torque tube 118 are similar in construction and arrangement with the difference that second control horn body 116 and second torque tube are arranged on an end of tail rotor blade 100 opposite first control horn body 112 and first torque tube 114.

Spar 110 has a longitudinally extending spar body 120. Longitudinal-extending spar body 120 defines a central aperture 122 within an inboard portion of spar 110 and disposed longitudinally opposed outboard ends of spar 110. Spar 110 is fixed at its center portion by a rigid hub arrangement, which serves to transmit engine torque and to react to flight loads. First control horn body 112 is longitudinally offset from central aperture 122 and on a side thereof longitudinally opposite second control horn body 116. First control horn body 112 has an inboard end 124 and a longitudinally opposite outboard end 126, inboard end 124 being adjacent to central aperture 122 and outboard end 126 being disposed on a side of inboard end 124 longitudinally opposite central aperture 122.

Control horn body 112 defines axis 106 and has a linkage seat 128 (e.g., a clevis), an inner flange 130, and an outer flange 132. Axis 106 extends through control horn body 112 between inboard end 124 and outboard end 126. It is contemplated that control horn body 112 comprise a rigid material 134 that provides control horn body 112 with suitable rigidity, such as aluminum, steel, titanium, or an alloy thereof. It is also contemplated that spar body 120 include a resilient material 136, e.g., flexible relative to rigid material 134, such as graphite/epoxy and/or a composite material. As will be appreciated by those of skill in the art in view of the present disclosure, resilient material 136 provides spar 110 with sufficient flexibility to twist about axis 106 while providing suitable strength to resist the bending force associated with thrust 28 (shown in FIG. 2), centrifugal force, and other forces exerted on tail rotor blade 100.

Linkage seat 128 is defined at a location that is laterally offset from axis 106 and receives collective force 38 (shown in FIG. 2) via linkages 36 (shown in FIG. 2). Collective force 38 rotates control horn body 112 about axis 106 owing to rigid material 134, and twists spar 110 owing to the flexibility provided by resilient material 136. As will be appreciated, since torque tube 114 is fixed to control horn body 112 by control horn arrangement 102, collective force 38 changes pitch of control by twisting torque tube 114 about axis 106, spar 110 providing longitudinal support to torque tube 114 irrespective of the amount of twist imparted by collective force 38. A pivot bearing mounting to spar 110 reacts to collective force, thereby providing a location and flexibility to create torque about axis 106. In the illustrated exemplary embodiment linkage seat 128 is defined on a side of a trailing edge 148 of control horn body 112 that is opposite axis 106, thereby providing sufficient lever distance to provide suitable control authority through a predetermined range of motion.

Inner flange 130 and outer flange 132 are each arranged on outboard end 126 of control horn body 112. Inner flange 130 extends continuously about axis 106 and spar 110. Outer flange 132 is arranged radially outward of inner flange 130, and axially overlays inner flange 130 such that inner flange 130 is disposed radially between outer flange 132 and axis 106 and holds the torque tube 114 therebetween. Outer flange 132 extends partially about axis 106. It is contemplated that outer flange 132 can be interrupted by one or more gaps. In certain embodiments, outer flange 132 can extend continuously about axis 106.

Figure 4:
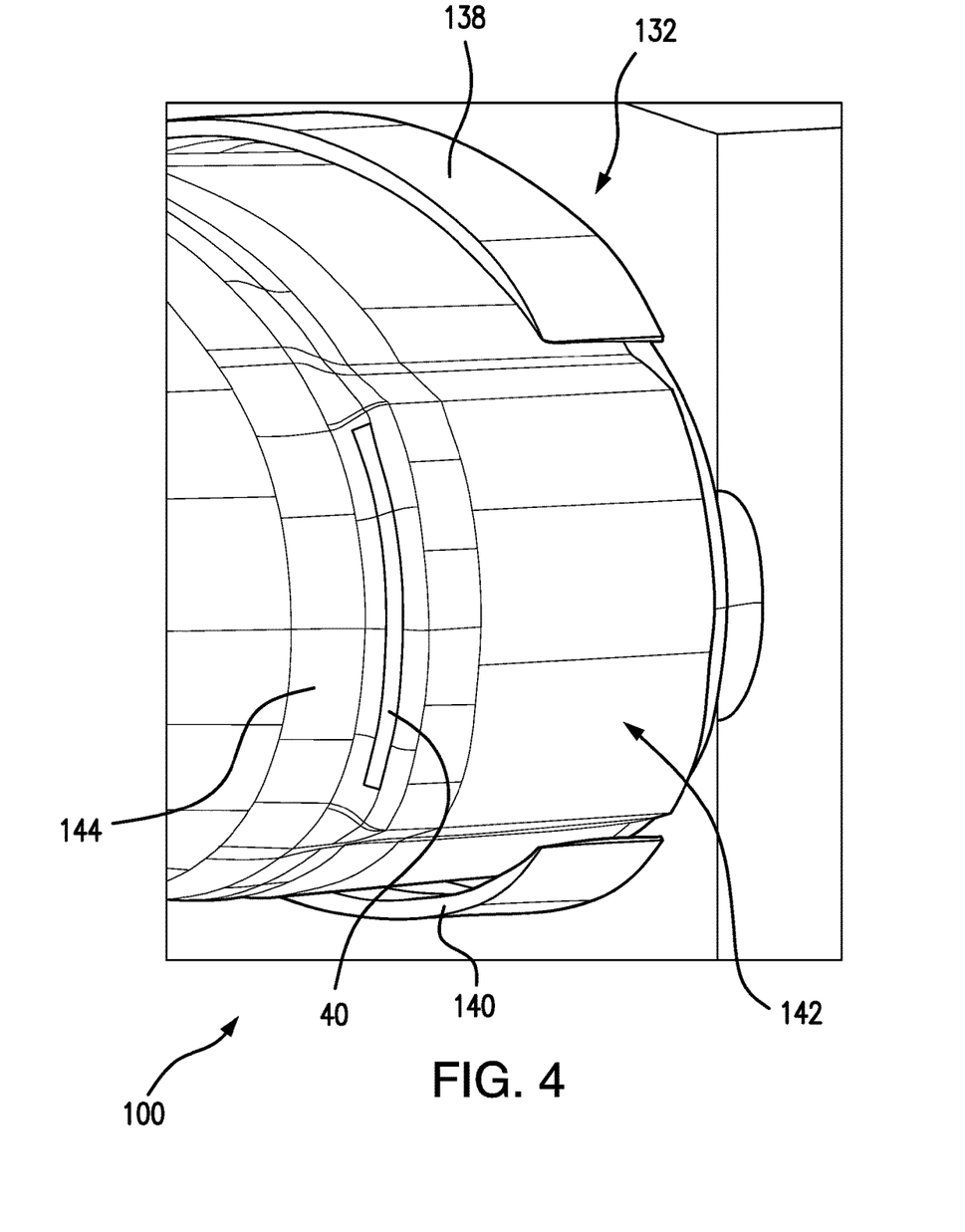
FIG. 4 is a perspective view of the tail rotor blade of FIG. 1, showing an outer flange of the control horn arrangement with a leading edge gap, according to an embodiment.

Referring to FIG. 4, outer flange 132 is shown according to an embodiment. Outer flange 132 is segmented into a suction-surface segment 138 and a pressure-surface segment 140, suction-surface segment 138 being separated from pressure-surface segment 140 by a leading edge gap 142. While outer flange 132 is illustrated herein as being segmented by one or more gaps, e.g., a leading edge gap 142 and/or a trailing edge gap 146 (shown in FIG. 5), it is to be understood and appreciated that outer flange 132 can, in certain embodiments, extend continuously about axis 106 within interruption by a gap.

Leading edge gap 142 is disposed on a leading edge 144 of tail rotor blade 100, separates suction-surface segment 138 from the pressure-surface segment 140 of outer flange 132, and provides an installation envelope for a rotor blade accessory. In the illustrated exemplary embodiment the rotor blade accessory is an ice protection system element 40, which may be a conductor or a heater element, which overlays inner flange 130 (shown in FIG. 3), leading edge gap 142 allowing outer flange 132 to provide additional structural support to control horn arrangement 102 without complicating installation of ice protection system element 40 or other rotor blade accessories.

Figure 5:
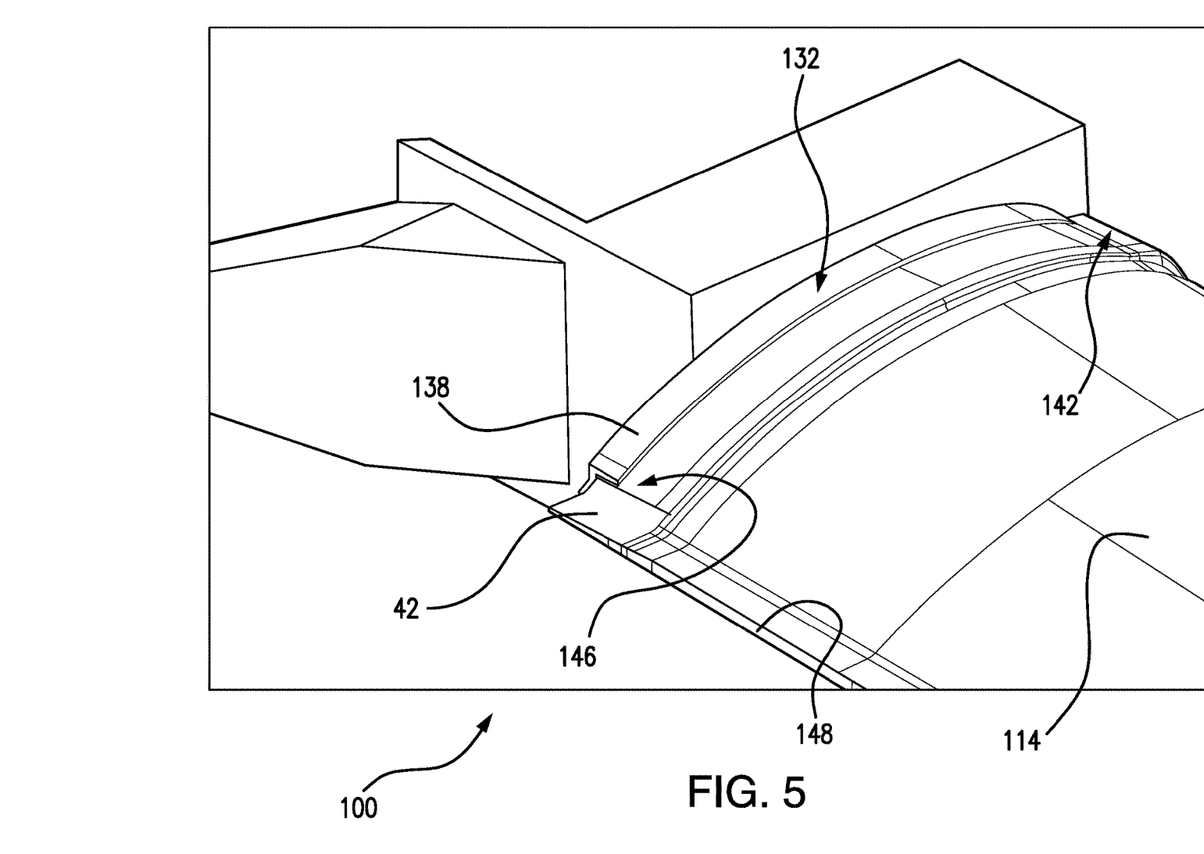
FIG. 5 is a perspective view of the tail rotor blade of FIG. 1, showing an outer flange of the control horn arrangement with a trailing edge gap, according to another embodiment.
Figure 6:
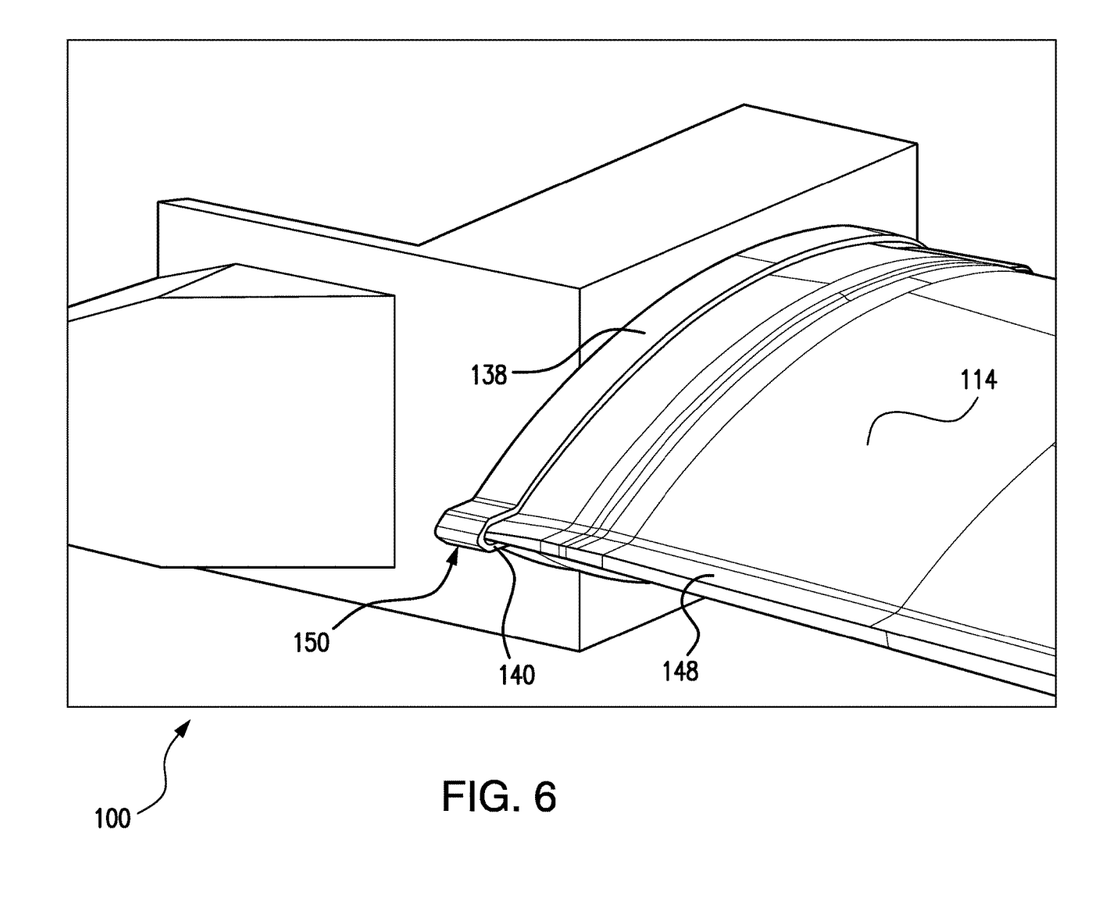
FIG. 6 is a perspective view of the tail rotor blade of FIG. 1, showing an outer flange of the control horn arrangement with a trailing edge closure, according to yet another embodiment.

Referring to FIG. 5, in accordance with certain embodiments, the at least one gap can be a trailing edge gap 146. Trailing edge gap 146 is disposed on a trailing edge 148 of tail rotor blade 100, separates suction-surface segment 138 and a pressure-surface segment 140 (shown in FIG. 4), and provides an installation envelope for a rotor blade accessory. In the illustrated exemplary embodiment the rotor blade accessory is a doubler 42, which provides additional strength to trailing edge 148 of torque tube 114 and overlays inner flange 130, trailing edge gap 146 allowing outer flange 132 to provide additional structural support to control horn arrangement 102 without complicating installation of doubler 42. It is to be understood that outer flange 132 can be segmented by both leading edge gap 142 (shown in FIG. 4) and trailing edge gap 146, thereby providing installation envelopes for rotor blade accessories on both leading edge 144 and trailing edge 148 of tail rotor blade 100.

While shown with both a leading edge gap 142 and trailing edge gap 146, it is understood that two gaps are not requires in all aspects. By way of example, referring to FIG. 6, it is contemplated that suction-surface segment 138 and pressure-surface segment 140 can couple to one another by a closure 150. Closure 150 connects suction-surface segment 138 with pressure-surface segment 140 and spans trailing edge 148 such that there is no trailing edge gap 146. Closure 150 encloses trailing edge 148 of torque tube 114, providing additional mechanical lock to trailing edge 148 of torque tube 114. In certain embodiments the additional mechanical lock provided by closure 150 eliminates the need for trailing edge doubler, simplifying manufacture of tail rotor blade 100 by eliminating the secondary bond operation otherwise necessary to fix a trailing edge doubler to trailing edge 148.

Figure 7:
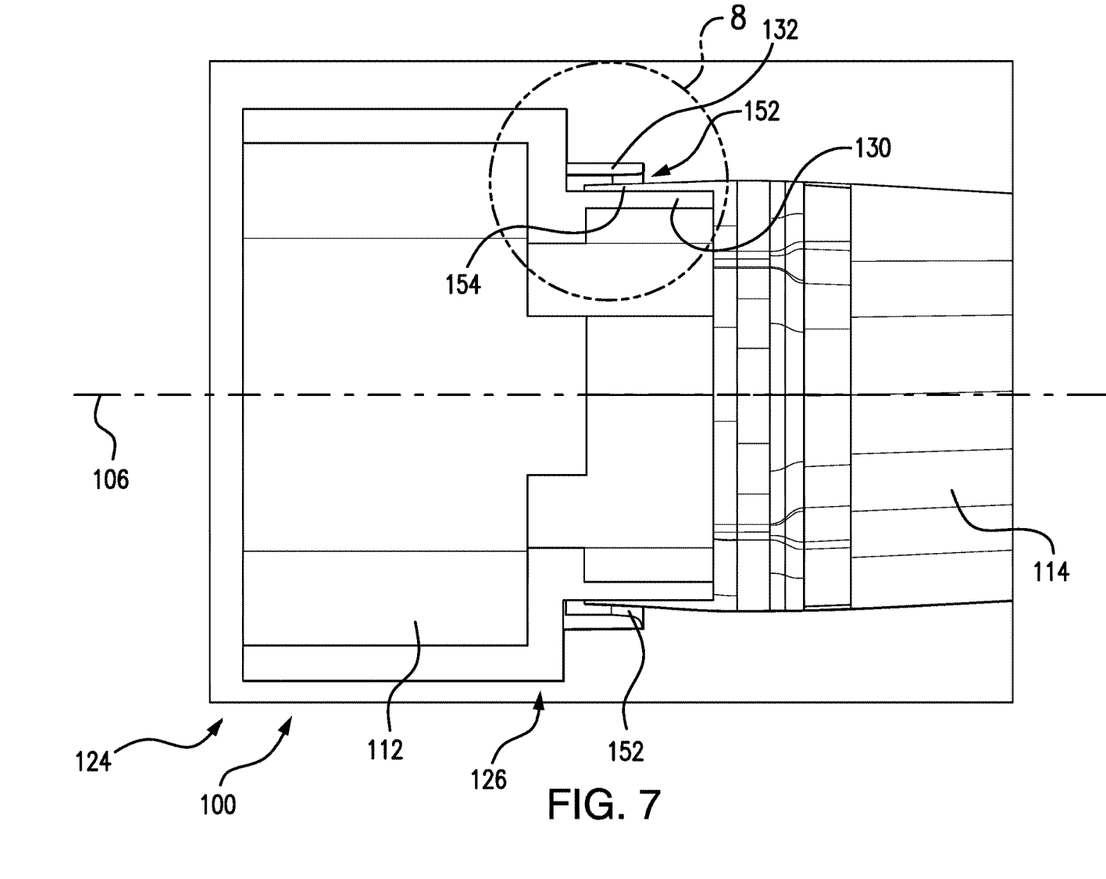
FIG. 7 is a cross-section side view of the tail rotor blade of FIG. 1, showing the torque tube seated in an receptacle defined between the inner and outer flanges of the control horn body.

With reference to FIG. 7, tail rotor blade 100 is shown in longitudinal cross section. Tail rotor blade 100 includes control horn body 112 and torque tube 114. Control horn body 112 has inboard end 124, opposed outboard end 126, and defines torque tube axis 106, which extends along tail rotor blade 100 between inboard end 124 and outboard end 126 of control horn body 112. Inner flange 130 and outer flange 132 are disposed on control horn body outboard end 126, inner flange 130 and outer flange 132 extending about torque tube axis 106 to define a receptacle 152 therebetween. An inboard end 154 of torque tube 114 seats in receptacle 152, and is captured therein.

Figure 8:
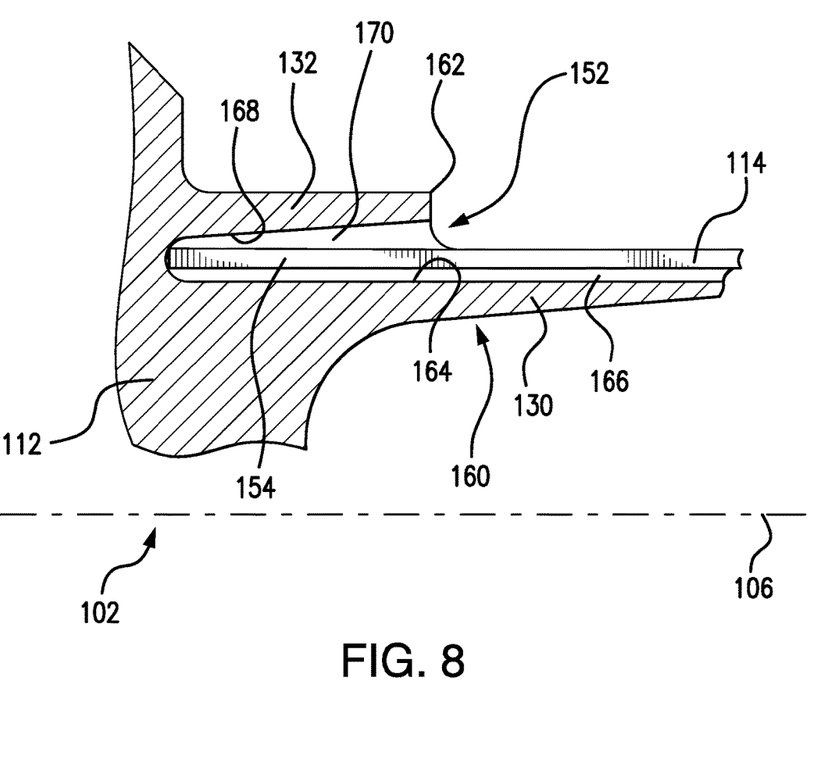
FIG. 8 is a partial cross-sectional view of the receptacle of FIG. 7, showing inner and outer adhesive layers disposed within the receptacle and fixing the torque tube to the control horn body.

With reference to FIG. 8, a portion of control horn arrangement 102 is shown. Inner flange 130 of control horn body 112 extends axially along torque tube axis 106 to a location 160, which is axially beyond an outer flange 132. Outer flange 132 extends to an outboard location 162, which is longitudinally disposed between location 160 and control horn body 112. Outer flange 132 is angled (obliquely) away from inner flange 130 in the axially outboard direction, which renders receptacle 152 wider at its outboard end than at its inboard end. The angle is such that an outer portion of outer flange 132 is spaced apart further from inner flange 130 than an axially inner portion of outer flange 132, receptacle 152 thereby tapering from a relatively wide outboard width to a relatively narrow inboard width. As will be appreciated, other receptacle geometries are possible and remain with the scope of the present disclosure.

Inner flange 130 has a torque tube-facing surface 164 with an inner adhesive layer 166 disposed thereon. Inner adhesive layer 166 fixes torque tube 114 to control horn body 112 from within receptacle 152. Outer flange 132 has a torque tube-facing surface 168, which is angled obliquely relative to torque tube-facing surface 164, and which has an outer adhesive layer 170 disposed thereon. Outer adhesive layer 170 also fixes torque tube 114 to control horn body 112 from within receptacle 152, providing additional strength to the connection between torque tube 114 and control horn body 112.

Some tail rotor assemblies have hollow composite torque tube structures adhesively bonded to aluminum control horns. Under certain circumstances the torque tube can disbond (i.e. separate) from the control horn, fracture structural elements that otherwise retain the torque tube structural integrity, split the trailing edge pressure surface to suction surface bond, cause the torque tube to collapse, and potentially allow the pitch horn to translate outboard along the rotor blade spar. Such change to the tail rotor structure can result in tail rotor assembly imbalance and/or reduced tail rotor authority, potentially limiting the operational capability of the rotorcraft.

In embodiments described herein, control horn arrangement 102 includes a mechanical capture feature. The mechanical capture feature is provided by inner flange 130 outer flange 132 which define therebetween receptacle 152. Receptacle 152 provides a mechanical capture feature that increases the strength of fixation of torque tube 114 to control horn body 112, supplementing the bond with mechanical capture of torque tube 114 within receptacle 152.

In certain embodiments described herein, control horn arrangement 102 provides structural elements that increase strength of fixation of torque tube 114 in control horn body 112. In particular, outer adhesive layer 170 supplements the bond area provided by inner adhesive layer 166 and creates a double shear bond joint within receptacle 152 between torque tube 114 and control horn body 112. Receptacle 152 is configured with geometry that allows for non-tapered torque tube wall thickness, which provides greater bearing strength to accommodate control horn centrifugal force. It is contemplated that use of a closure on the outer flange along the trailing edge of the pressure surface/suction surface joint can eliminate the need for a structural doubler as the joint is stronger and more damage tolerant than would otherwise be present in the control horn arrangement.

In accordance with certain embodiments, control horn arrangement 102 can provide relative high bearing strength, reducing (or eliminating) potential for torque tube 114 to crush due to horn centrifugal force. Control horn arrangement 102 also maintains the shape of torque tube 114 in a stable joint between inner flange 130 and outer flange 132, preventing buckling of the torque tube structure under pitch horn centrifugal force. It is also contemplated that the trailing edge skin to skin bond can be provided with a local, redundant load path, reducing the likelihood of the trailing edge bond splitting due to flight loads or foreign object contact. The trailing edge closure can make the discontinuous torque tube structure a continuous structure, improving the ability of the structure to carry torsion loads due to the mechanical lock provided by the closure and reduction (or elimination) of peak adhesive shear stresses caused by trailing edge discontinuities.

The methods and systems of the present disclosure, as described above and shown in the drawings, provide for tail rotor blades with superior properties including improved strength of the fixation between torque tubes and control horn bodies in helicopter tail rotor blades. Moreover, the tail rotor blades described herein provide redundant load paths with the pitch horn joint, slowing degradation of the joint or incipient failure within the joint, enabling it more likely that such degradation or incipient failure could be detected and remedied prior to the joint failing. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A control horn arrangement connection to a torque tube, comprising:
    a control horn body with an inboard end and an opposed outboard end, the control horn body defining a torque tube axis extending between the inboard and outboard end of the control horn body;
    an inner annular flange extending from the control horn body outboard end; and
    an outer annular flange extending from the control horn body outboard end,
    wherein the inner annular and outer annular flanges extend about and are co-axial with the torque tube axis and define a receptacle to fix the torque tube to the outboard end of the control horn body.

2. The control horn arrangement as recited in claim 1, wherein the inner annular flange extends continuously about the torque tube axis.

3. The control horn arrangement as recited in claim 1, wherein the outer annular flange extends only partially about the torque tube axis.

4. The control horn arrangement as recited in claim 1, wherein the outer annular flange has a pressure-side segment and an opposed suction-side segment, the suction side being separated from the pressure side by a gap.

5. The control horn arrangement as recited in claim 4, wherein the gap is disposed on a leading edge of the control horn body.

6. The control horn arrangement as recited in claim 4, wherein the gap is disposed on a trailing edge of the control horn body.

7. The control horn arrangement as recited in claim 4, further comprising a closure connecting the suction-side segment to the pressure-side segment.

8. The control horn arrangement as recited in claim 1, wherein the outer annular flange radially overlaps the inner annular flange.

9. The control horn arrangement as recited in claim 1, wherein the inner annular flange extends axially along the torque tube axis to a location axially beyond the outer annular flange.

10. The control horn arrangement as recited in claim 1, wherein the outer annular flange is angled away from the inner annular flange.

11. The control horn arrangement as recited in claim 1, wherein an axially outer portion of the outer annular flange is spaced apart further from the inner annular flange than an axially inner portion of the outer annular flange.

12. The control horn arrangement as recited in claim 1, wherein the inner annular flange has torque tube-facing surface with an adhesive layer on the inner annular flange torque tube-facing surface.

13. The control horn arrangement as recited in claim 1, wherein the outer annular flange has torque tube-facing surface with an adhesive layer on the outer annular flange torque tube-facing surface.

14. The control horn arrangement as recited in claim 1, further comprising a torque tube seated in the receptacle and bonded to the inner and outer annular flanges of the control horn body.

15. A rotorcraft having a rotor assembly with the control horn arrangement as recited in claim 1.

16. A rotor assembly, comprising:
    a control horn body with an inboard end and an opposed outboard end, the control horn body defining a torque tube axis extending between the inboard and outboard end of the control horn body, wherein the control horn body has an inner annular flange and an outer annular flange disposed on the outboard end of the control horn body, the inner annular flange and the outer annular flange being co-axial with and extending about the torque tube axis, and defining a receptacle;

a torque tube with an inboard end seated in the receptacle and opposed suction-side and pressure-side surfaces extending longitudinally from the inboard end, the torque tube inboard end defining an inner gap between the torque tube inboard end and the inner annular flange, the torque tube inboard end defining an outer gap between the torque tube inboard end and the outer annular flange;

an inner adhesive layer disposed within the inner gap between the inboard end of the torque tube and the inner annular flange, the inner adhesive layer bonding the torque tube to the control horn body; and an outer adhesive layer disposed within the outer gap between the inboard end of the torque tube and the outer annular flange, the outer adhesive layer bonding the torque tube to the control horn body.

17. The rotor assembly as recited in claim 16, wherein the outer annular flange radially overlaps the inner annular flange, wherein the inner annular flange extends axially beyond the outer annular flange, wherein the outer annular flange is angled away from the inner annular flange, and wherein an axially outer portion of the outer annular flange is spaced apart further from the inner annular flange than an axially inner portion of the outer annular flange.

18. The rotor assembly as recited in claim 16, further comprising an ice protection circuit fixed to a leading edge of the torque tube, the ice protection circuit radially overlapping the inner annular flange.

19. The rotor assembly as recited in claim 16, wherein the outer annular flange has a pressure side and an opposed suction side, the suction side being separated from the pressure side by a gap disposed on a leading edge of the control horn body, wherein the suction side is separated from the pressure side by a gap disposed on a trailing edge of the control horn body.

20. A rotorcraft anti-torque system having a rotor assembly as recited in claim 16.

* * * * *